June 4, 1940.  R. J. SMITH  2,203,110

THERMOSTATICALLY CONTROLLED VALVE

Filed April 6, 1938

Inventor
Russell J. Smith
by Rippey & Cassidy
His Attorneys

Patented June 4, 1940

2,203,110

UNITED STATES PATENT OFFICE 2,203,110

THERMOSTATICALLY CONTROLLED VALVE

Russell J. Smith, Richmond Heights, Mo.

Application April 6, 1938, Serial No. 200,303

6 Claims. (Cl. 236—56)

This invention relates to thermostatically controlled valves, and has special reference to valves controlling single pipes for the flow of steam to radiators and the flow of condensate from the radiators through the same pipes.

An object of the invention is to provide an improved valve for use in connection with a pipe and operated thermostatically to control the passage of steam therethrough in one direction toward a radiator or the like, and also to control the flow of condensate therethrough in the opposite direction.

Other objects will be apparent from the following description, reference being made to the annexed drawing, in which—

Figure 1:
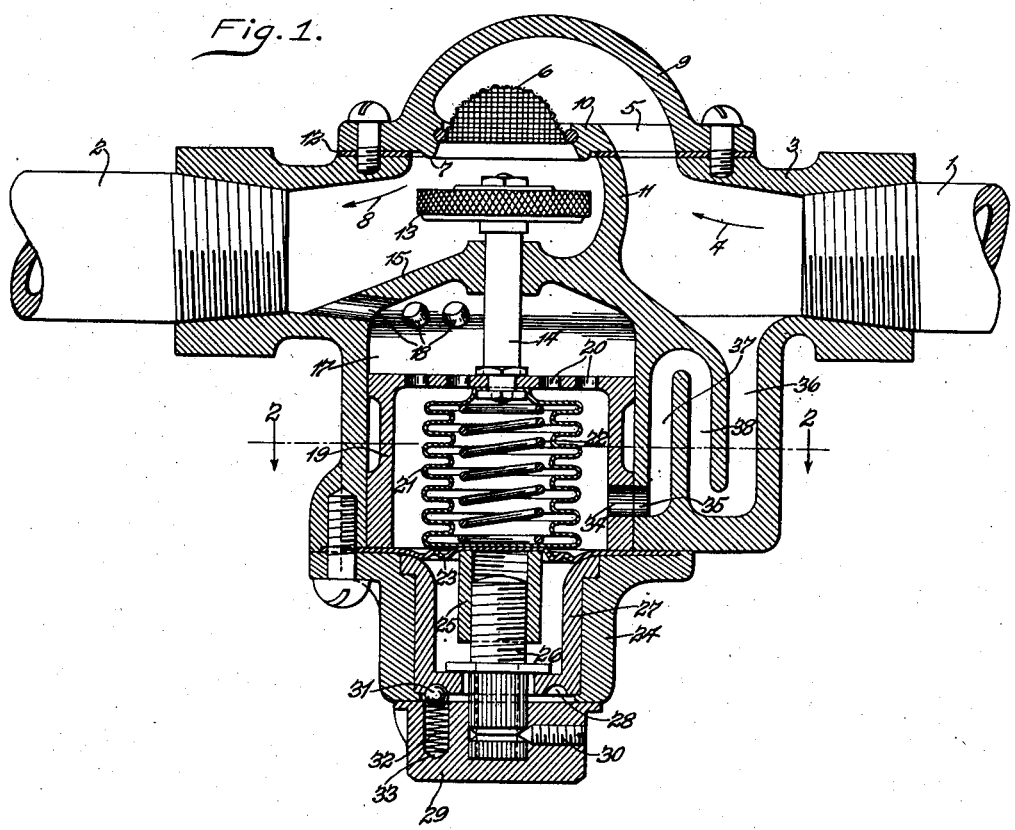
Fig. 1 is a longitudinal sectional view of my improved valve device for controlling the flow of steam in one direction and the flow of condensate in the opposite direction.
Figure 2:
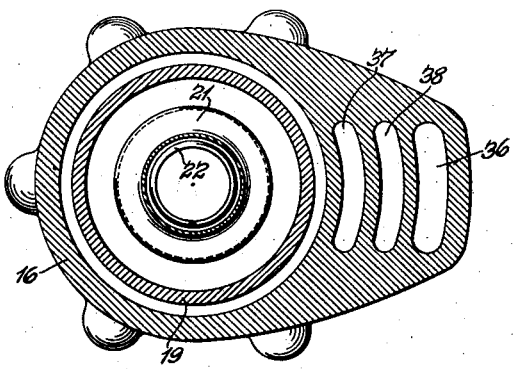
Fig. 2 is a sectional view approximately on the line 2—2 of Fig. 1.

The valve housing provides a connection and a passage between the pipe sections 1 and 2. The steam passes from the pipe section 1 into the housing 3 and travels in the direction of the arrow 4 through the upper portion of the housing having therein a passage 5; through the screen 6 which may or may not be used, according to circumstances; and thence past the valve seat 7 in the direction of the arrow 8, and through the pipe section 2 to the radiator. The part of the housing including the passage 5 and supporting screen 6 comprises an appropriately shaped detachable cap or plate 9 having an integral web 10 which cooperates with the web or wall 11 in the housing 3 to provide the passage shown. A gasket 12 provides a leak-proof joint between the housing and the cap or plate 9.

A valve 13 is attached to one end of the valve stem 14 mounted for sliding movements through the wall 15 to and from contact with the valve seat 7 in order to close and to open the steam passage through the housing.

The wall 15 cooperates with the integral wall 16 to form a compartment 17 into which ports 18 open at the effluent side of the valve 13 for the flow of condensate from the radiator through the lower portion of the pipe section 2. A yoke 19 is mounted for sliding movements in the compartment 17, and has through its end wall ports 20 for the flow of condensate to the inside of said yoke. The valve stem 14 is attached to the end wall of the yoke 19 and to the adjacent end of the bellows 21 enclosed within the yoke 19 and in which a spring 22 is confined. The lower end of the bellows 21 seats against a sealing diaphragm 23 forming an hermetic joint at the lower end of the compartment 17 and clamped between the lower end of the wall 16 and a retaining yoke 24 detachably secured to the wall 16. The central portion of the diaphragm 23 against which the bellows 21 seats is supported by and attached to a sleeve 25 screwed upon an adjusting member 26 extending downwardly through a hole in the lower end wall of a cup 27 rigidly mounted in the yoke 24 and having in the underside of its lower end wall an annular series of indentations 28. A knob 29 is attached to the lower end of the adjusting member 26 by a set screw 30 screwed into clamping engagement with the adjusting member 26 so that, when the knob 29 is rotated, it will rotate the adjusting member 26 and thereby move the sleeve 25 longitudinally to compress or expand the bellows 21 by controlling the base portion of said bellows. A detent 31 supported by a spring 32 mounted in a well 33 formed in the knob 29 engages in the respective indentations 28 and thereby latches the knob 29 against accidental turning.

When the valve 13 is completely open, a port 34 formed in the side wall of the yoke 19 is in communication with a port 35 through the wall 16. A tortuous passage is formed in the housing 3 having one end in communication with the port 35 and the opposite end in communication with a reservoir 36 opening into the housing 3 adjacent to the open end of the pipe section 1. Said passage comprises a portion 37 extending upwardly from the port 35 and a portion 38 forming communication between the upper end of the portion 37 and the lower end of the reservoir 36. As shown, the yoke 19 constitutes a cage for the bellows 21 and also functions as a valve for opening and closing the port 35 in synchronism with the opening and closing of the passage 5 by the valve 13.

In operation, when the radiator to be warmed is cold, steam may pass from the pipe section 1 in the direction of the arrow 4, through the passage 5, the screen 6, past the valve 13 in the direction of the arrow 8, and thence through the pipe section 2 to the radiator. Condensate formed in the radiator will flow along the lower side of the pipe 2 through the ports 18 and 20 into the yoke 19, through the ports 34 and 35 and the tortuous passage 37, 38, into the reservoir 36, and thence through the lower portion of the pipe section 1 to the boiler. The water contained in the reservoir 36 and other parts in communication therewith forms a seal against the passage of steam therethrough. As the temperature of the condensate returning to the compartment 17 increases, the bellows 21 will be expanded and thereby close the steam inlet valve 13, and also closing the ports 34 and 35 in the same relation and at the same time. Higher final room temperatures or lower final room temperatures can be obtained by turning the knob 29 to proper adjusted positions, thereby controlling the base portion of the bellows 21. The diaphragm 23, in addition to supporting the bellows 21 and holding the sleeve 25 from turning, constitutes a seal between the steam and water carrying parts of the valve and the adjusting device.

The invention may be varied within the scope of equivalent limits without departure from the nature and principle thereof.

I claim:

1. In a thermostatically controlled valve device comprising a housing connecting two pipe sections and having a passage for conducting steam from one of said two pipe sections to the other; means in connection with said housing forming a compartment having an inlet port communicating with said second pipe section and also having an outlet port, means forming a reservoir passage from said outlet port to said first pipe section for conducting condensate from said compartment to said first pipe section and for holding condensate sealing and preventing flow of steam from said first pipe section to said compartment, a valve in said housing controlling said steam passage, a second valve enclosed in said housing for opening and closing said outlet port, a stem connecting said two valves, and a thermostatic device connected with said second valve in said compartment and responsive to the temperature of the condensate in said compartment for operating said two valves in synchronism and in the same relation to said steam passage and to said outlet, respectively.

2. In a thermostatically controlled valve device comprising a housing connecting two pipe sections and having a passage for conducting steam from one of said two pipe sections to the other; means in connection with said housing forming a compartment communicating with said second pipe section, means forming a reservoir passage from said compartment to said first pipe section for conducting condensate from said compartment to said first pipe section and for holding the condensate sealing and preventing flow of steam from said first pipe section to said compartment, a valve in said housing controlling said steam passage, another valve in and guided by said compartment for controlling said reservoir passage, a stem connecting said two valves and extending for sliding movements through one wall of said housing, and a thermostatic device attached to said second valve in said compartment for operating said two valves in synchronism and in the same relation to said steam passage and to said condensate passage, respectively.

3. In a thermostatically controlled valve device comprising a housing connecting two pipe sections and having a passage for conducting steam from one of said two pipe sections to the other; walls in connection with said housing forming a compartment having communication with said second pipe section, means in said housing forming a reservoir passage from said compartment to said first pipe section and arranged to hold condensate to seal said compartment and prevent flow of steam thereto from said first pipe section, a valve in said housing for opening and closing said steam passage, a second valve enclosed in said compartment for opening and closing said condensate passage, a stem connecting and holding said two valves in rigid relationship with respect to each other and extending for sliding movements through one wall of said housing, a device responsive to the temperature of the condensate in said compartment for moving said second valve and thereby said first valve in synchronism and in the same relation to said respective passages, and means for supporting said device in different adjusted positions to vary the thermostatic conditions under which said valves will be moved completely to open or to closed positions by said device.

4. In a thermostatically controlled valve device comprising a housing having a passage for conducting steam therethrough in one direction; a valve seat in said housing surrounding said passage, means in connection with said housing forming a compartment having an inlet port communicating with said passage beyond the effluent side of said valve seat and having an outlet port communicating with said passage beyond the influent side of said valve seat, a valve stem extending for sliding movements through one wall of said housing into said passage and into said compartment, a valve attached to said valve stem in said passage, a valve attached to said valve stem in said compartment for opening and closing one of said ports, and a thermostatic device in said compartment responsive to the temperature of the condensate in said compartment for moving said second valve and thereby said first valve in synchronism and in the same relation to said outlet port and said passage, respectively, to open and close the same.

5. In a thermostatically controlled valve device comprising a housing having a passage for conducting steam therethrough in one direction; a valve seat in said housing surrounding said passage, means in connection with said housing forming a compartment having an inlet port communicating with said passage beyond the effluent side of said valve seat and having an outlet port communicating with said passage beyond the influent side of said valve seat, a valve stem extending for sliding movements through one wall of said housing into said passage and into said compartment, a valve attached to said valve stem in said passage, a valve attached to said valve stem in said compartment for opening and closing one of said ports, a thermostatic device in said compartment responsive to the temperature of the condensate in said compartment for moving said second valve and thereby said first valve in synchronism and in the same relation to said outlet port and said passage, respectively, to open and close the same, and a spring engaging and cooperating with said thermostatic device for moving said valves to closed positions.

6. In a thermostatically controlled valve device comprising a housing having a passage for conducting steam therethrough in one direction; a valve seat in said housing surrounding said passage, means in connection with said housing forming a compartment having an inlet port communicating with said passage beyond the effluent side of said valve seat and having an outlet port communicating with said passage beyond the influent side of said valve seat, a valve stem extending for sliding movements through one wall of said housing into said passage and into said compartment, a valve attached to said valve stem in said passage, a valve attached to said valve stem in said compartment for opening and closing one of said ports, a thermostatic device in said compartment responsive to the temperature of the condensate in said compartment for moving said second valve and thereby said first valve in synchronism and in the same relation to said outlet port and said passage, respectively, to open and close the same, an element supporting and attached to said thermostatic device, a member engaging and supporting said element, and means for operating said member to move said element to different adjusted positions and thereby regulate said thermostatic device and vary the thermostatic conditions under which said valves will be moved completely to open or to closed positions by said thermostatic device.

RUSSELL J. SMITH.